United States Patent
Espallargas et al.

(10) Patent No.: US 12,320,009 B2
(45) Date of Patent: Jun. 3, 2025

(54) THERMAL SPRAYING OF CERAMIC MATERIALS

(71) Applicant: SERAM COATINGS AS, Oslo (NO)

(72) Inventors: Nuria Espallargas, Trondheim (NO); Fahmi Mubarok, Trondheim (NO)

( * ) Notice: Subject to any disclaimer, the term of this patent is extended or adjusted under 35 U.S.C. 154(b) by 0 days.

(21) Appl. No.: 14/438,933

(22) PCT Filed: Nov. 1, 2013

(86) PCT No.: PCT/EP2013/072861
§ 371 (c)(1),
(2) Date: Sep. 22, 2015

(87) PCT Pub. No.: WO2014/068082
PCT Pub. Date: May 8, 2014

(65) Prior Publication Data
US 2015/0307980 A1    Oct. 29, 2015

(30) Foreign Application Priority Data

Nov. 1, 2012  (GB) .................................... 1219642

(51) Int. Cl.
*C23C 4/10*   (2016.01)
*C04B 35/563*   (2006.01)
(Continued)

(52) U.S. Cl.
CPC .............. *C23C 4/10* (2013.01); *C04B 35/563* (2013.01); *C04B 35/565* (2013.01);
(Continued)

(58) Field of Classification Search
CPC .. C23C 4/10; C23C 4/122; C23C 4/02; C23C 4/06; C23C 4/134; C23C 4/126; C04B 35/62886; C04B 35/563; C04B 35/565; C04B 35/584; C04B 35/62802; C04B 35/62805; C04B 35/583
(Continued)

(56) References Cited

U.S. PATENT DOCUMENTS 4,619,817 A * 10/1986 Stambaugh ............ B82Y 30/00
423/266
4,814,128 A     3/1989 Lieberman et al.
(Continued)

FOREIGN PATENT DOCUMENTS

CN    101054299    10/2007
CN    101259532    9/2008
(Continued)

OTHER PUBLICATIONS

International Search Report and Written Opinion for PCT/EP2013/072861 dated Nov. 11, 2014.
(Continued)

*Primary Examiner* — Katherine A Bareford
(74) *Attorney, Agent, or Firm* — Thomas | Horstemeyer, LLP

(57) ABSTRACT

A process for thermally spraying metal oxide coated ceramic particles onto a substrate comprising: (i) obtaining a plurality of metal oxide coated particles of silicon carbide, silicon nitride, boron carbide or boron nitride; and (ii) thermally spraying the particles of step (I) onto a substrate.

20 Claims, 3 Drawing Sheets

(51) Int. Cl.
| | |
|---|---|
| *C04B 35/565* | (2006.01) |
| *C04B 35/583* | (2006.01) |
| *C04B 35/584* | (2006.01) |
| *C04B 35/628* | (2006.01) |
| *C23C 4/02* | (2006.01) |
| *C23C 4/126* | (2016.01) |
| *C23C 4/134* | (2016.01) |

(52) U.S. Cl.
CPC .......... *C04B 35/583* (2013.01); *C04B 35/584* (2013.01); *C04B 35/62802* (2013.01); *C04B 35/62805* (2013.01); *C04B 35/62886* (2013.01); *C23C 4/02* (2013.01); *C23C 4/126* (2016.01); *C23C 4/134* (2016.01)

(58) Field of Classification Search
USPC .................................................. 427/450, 452
See application file for complete search history.

(56) References Cited

U.S. PATENT DOCUMENTS

| | | | | |
|---|---|---|---|---|
| 5,098,740 | A | * | 3/1992 | Tewari .................. C04B 35/575 |
| | | | | 106/1.05 |
| 5,229,339 | A | | 7/1993 | Pujari et al. |
| 5,266,404 | A | * | 11/1993 | Jones ...................... B82Y 30/00 |
| | | | | 428/403 |
| 5,633,214 | A | * | 5/1997 | Nishio .................. C01B 21/064 |
| | | | | 501/103 |
| 6,015,630 | A | * | 1/2000 | Padture ................... B32B 15/04 |
| | | | | 416/241 B |
| 6,025,034 | A | | 2/2000 | Strutt et al. |
| 6,745,951 | B2 | | 6/2004 | Barykin et al. |
| 7,976,941 | B2 | | 7/2011 | Lodyga et al. |
| 9,662,711 | B2 | | 5/2017 | Miyashita et al. |
| 2004/0225156 | A1 | * | 11/2004 | Funke .................. C07C 253/30 |
| | | | | 564/448 |
| 2004/0256601 | A1 | | 12/2004 | Jubacek et al. |
| 2004/0258916 | A1 | | 12/2004 | Tului et al. |
| 2006/0121068 | A1 | * | 6/2006 | Sane ................. C04B 35/58007 |
| | | | | 424/400 |
| 2008/0168717 | A1 | | 7/2008 | Can et al. |
| 2009/0130324 | A1 | | 5/2009 | Shanker et al. |

FOREIGN PATENT DOCUMENTS

| | | | |
|---|---|---|---|
| DE | 103 32 938 | * | 2/2005 |
| EP | 210614 | | 7/1986 |
| JP | S5761664 | | 4/1982 |
| JP | 61243164 | | 4/1985 |
| JP | 63-169371 | | 7/1988 |
| JP | 03218957 | | 9/1991 |
| JP | 6-45862 | * | 6/1994 |
| JP | 11-286768 | | 10/1999 |
| JP | 2004137482 | | 5/2004 |
| JP | 2009-029692 | | 2/2009 |
| JP | 2011-178643 | | 9/2011 |
| WO | 2002075004 | | 9/2002 |
| WO | 03/004718 | * | 1/2003 |
| WO | 2003004718 | | 1/2003 |
| WO | 2010003035 | | 1/2010 |
| WO | 2018033557 | | 2/2018 |

OTHER PUBLICATIONS

Wielage, J. et al., International Thermal Spray Conference 2002, E. Lugscheider, ed., Dusseldorf, Germany: DVS-ASM International, 2002, 1047-1051.

Ge, M. et al., "Preparation of Superfine Powder Surface Encapsulating Film," Collected Papers for the Fourth SEssion of National Academic Conference for Preparation and Treatment of Particles, Nov. 30, 1995, p. 83-86 (English translation).

English translation of office action for Japanese patent application 2015-540136 dated Nov. 28, 2017.

European Search Report for 18179170.8 issued Sep. 24, 2018, 10pp.

Djuricic, B. et al., "Study of Particle Coatings for the Design of Intergranular Phases in Engineering Ceramics," 1995, Silicates Industriels, 7-8:203-210.

Garg, A.K. et al., "Microencapsulation of silicon nitride particles with yttria and yttria-alumina precursors," 1990, J. Mater. Res., 5:136-142.

Padture, N.P. et al., "Enhanced Machinability of Silicon Carbide via Microstructural Design," 1995, J. Am. Ceram. Soc., 78, 215-217.

Search Report for Eurasian Patent Application 2420-549890 EA dated Nov. 6, 2018, 4pp (no translation available).

* cited by examiner

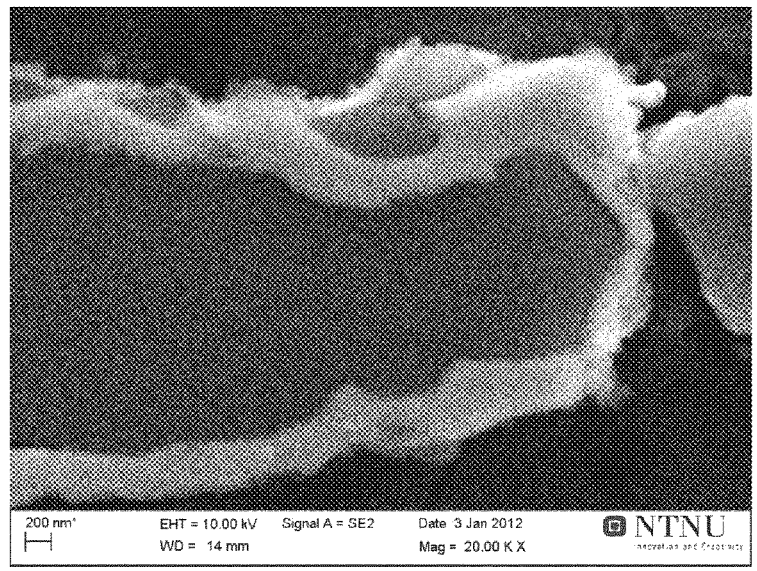
Figure 1
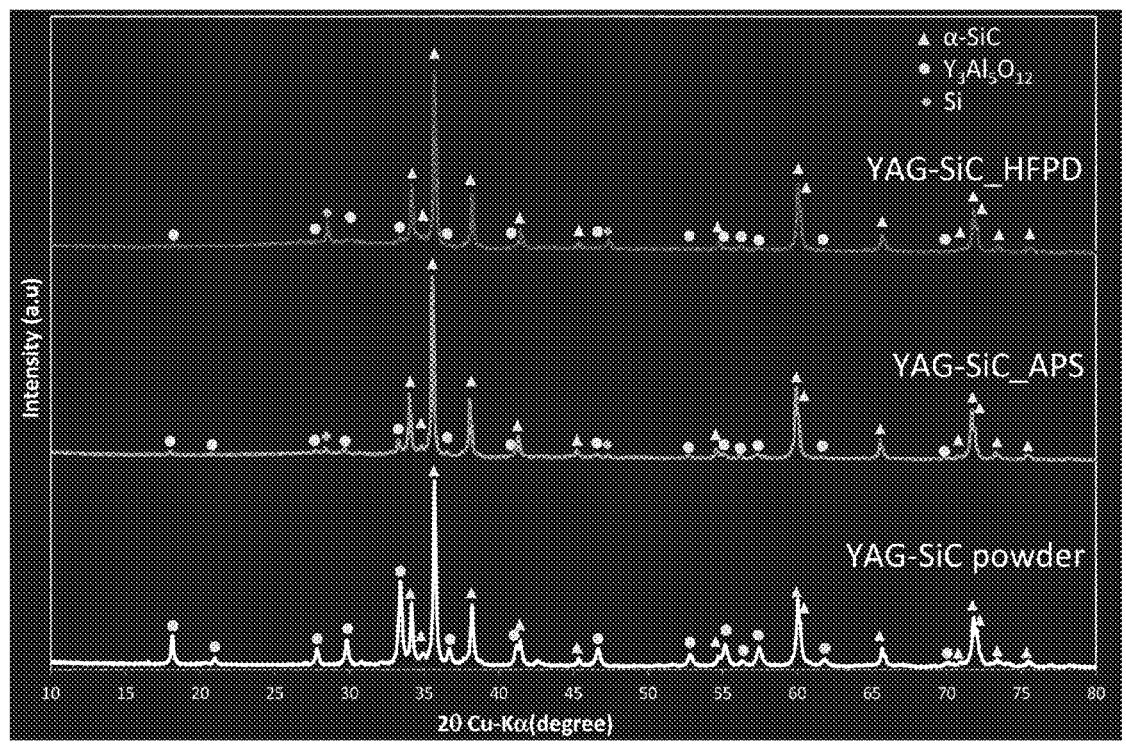
*Figure 2. XRD pattern of 30wt%YAG_SiC powders and the coating produced with this powder using HFPD and APS.*

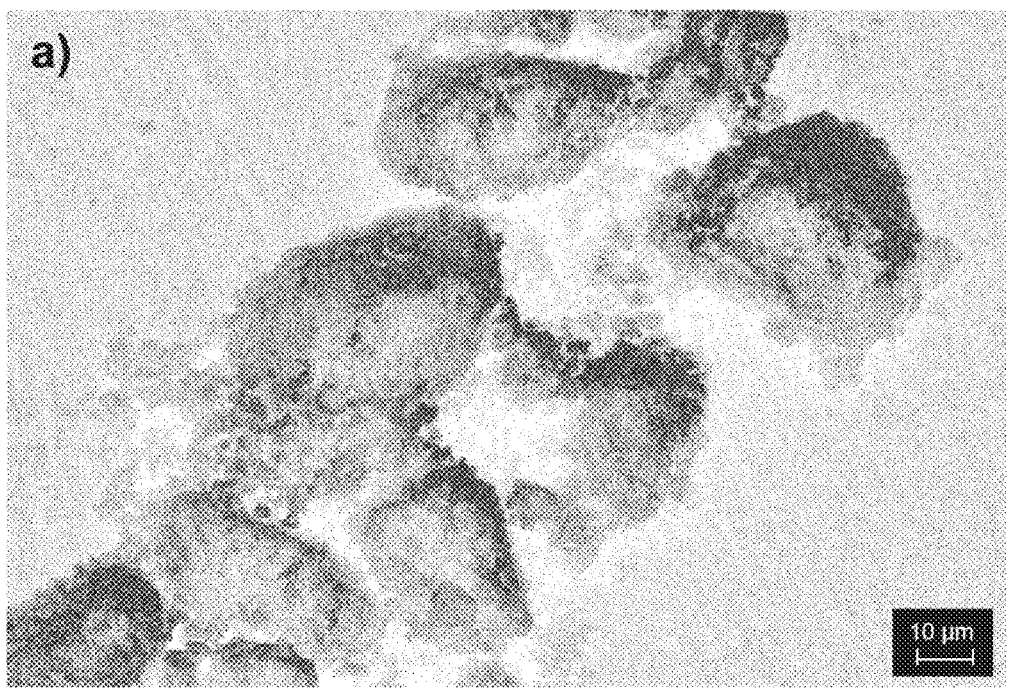
Figure 5. SiC agglomerated powder feedstock for HFPD.

THERMAL SPRAYING OF CERAMIC MATERIALS

IN THE CROSS-REFERENCE TO RELATED APPLICATIONS

This application is a U.S. national phase application under 35 USC 371 of international application number PCT/EP2013/072861, filed Nov. 1, 2013, which claims priority to Great Britain Application No. 1219642.4, filed Nov. 1, 2012, which is hereby incorporated herein by reference in its entirety for all purposes.

This invention relates to a process for thermally spraying metal oxide coated silicon or boron carbide or metal oxide coated silicon or boron nitride particles onto a substrate so as to provide valuable substrates coated with these ceramics. The invention also relates to a process for making these oxide coated ceramics with sufficiently thick coatings so that the coatings are capable of protecting the ceramic particle core during the thermal spraying operation. The coated particles themselves form a still yet further aspect of the invention along with articles coated using the process of the invention.

BACKGROUND

Silicon and boron carbide and nitride-based materials had been widely used in many industries due to their excellent combination of mechanical, thermal and chemical properties. These carbides and nitrides offer very good tribological properties and corrosion resistance and thus are generally used in coating applications requiring wear and abrasive resistance, e.g. in a corrosive environment. They compare favourably with more expensive materials such as diamond in terms of these properties.

Silicon carbide, for example, is widely used as protective coating in industrial applications such as in aerospace moving components, metal working tools and petrochemical pipes. This has made these ceramics an attractive synthetic target for inorganic chemists.

Most silicon and boron carbide and nitride coatings are generally deposited onto a substrate by physical vapour deposition (PVD) or chemical vapour deposition (CVD). These methods are expensive, time consuming, and limited to small articles which fit into the deposition chamber. The methods often require complex processing conditions.

Thermal and kinetic spray processes have been generally accepted as one of the most effective and economic methods for producing metallic and ceramic coatings on small to large scale components. However, these methods are not always suitable for depositing ceramic carbides or nitrides due to decomposition or sublimation of metal and carbide species at the temperatures necessary to thermally spray them. This is true for the cases of silicon and boron carbides and their nitrides.

There are however some processes for thermal coating using SiC in the literature. Powders of 50-60 vol % SiC+Ni/Co can be mechanically alloyed with high energy milling. A high velocity oxy-fuel (HVOF) process (a type of thermal spraying process) can then be used to produce SiC coatings (See Wielage, J. et al, International Thermal Spray Conference 2002, E. Lugscheider, eds., Düsseldorf, Germany: DVS-ASM International, (2002), pp. 1047-1051.) The components of this process exist however as separate phases within the blend. There is no particle coating process here.

Alternatively, powders of 67 wt. % SiC+21.2 wt. % $Al_2O_3$ & 11.8 wt. % $Y_2O_3$ can be mixed, agglomerated and sintered. This mixture can be thermally sprayed using a detonation gun, atmospheric plasma spray or high velocity oxy-fuel (HVOF) process to produce SiC coatings (see WO 03/004718). The process involves mixing these materials milling, spray drying to produce agglomerate particles and then sintering in an inert atmosphere. The formed particles can then be thermally sprayed. Note that the metal oxides and the ceramic component form separate phases in this process. There is no coating possible in this process.

A more limiting process involves a blend of about 60 wt % SiC+40 wt. % boride binder selected from zirconium boride ($ZrB_2$), titanium boride ($TiB_2$) or hafnium boride ($HfB_2$) produced by spray drying (US20040258916). This process has to be carried out in the absence of oxygen so is impractical industrially.

The major problems to be addressed when preparing a SiC coating are its sublimation (at around 2500° C.) and its decomposition (also around the 2500° C. mark). The particles are exposed to these temperatures during thermal spraying. In order to prepare suitable particles of SiC and other ceramics, it is also necessary to sinter the ceramics and that also poses problems. Ensuring a homogenous distribution of sintering aid is key to ensuing a good particulate product and that is difficult.

The present inventors seek to avoid the problems of decomposition and sublimation of the ceramic material by encapsulating the ceramic in a relatively thick oxide coating.

Metal oxide coated ceramic particles are arguably known. U.S. Pat. No. 5,098,740 describes a process for coating ceramic particles such as SiC or silicon nitride with a metal hydroxide or metal oxide coating. The coatings envisaged in U.S. Pat. No. 5,098,740 are however, purely for providing homogenous distribution of sintering aids. The idea is to provide sintering additives via a coating with as little additive content as possible. The coatings in U.S. Pat. No. 5,098,740 are not believed to be thick enough to protect the core particle during thermal spraying.

The present inventors have realised that oxide coated ceramic particles are key to allowing thermal spraying. The inventors have devised a process for the formation of metal oxide coated ceramic particles and shown that these can be thermally sprayed without decomposition or sublimation of the core ceramic particle. The process of the invention therefore opens the door to comparatively cheap SiC type coatings on a wide variety of substrates.

It is a further object of the present invention to provide a method for forming silicon and boron carbide or nitride coatings on a substrate using thermal spray apparatus.

A key aspect in the formation of metal oxide coated ceramics is the formation of a non oxide coated intermediate particle whose coating is converted to an oxide via calcination and sintering. The present invention is based, inter alia, on the formation of an intermediate coating based preferably on a metal hydroxide or metal carbonate or based on a mixture of metal hydroxide and metal carbonate. These species are preferably themselves generated from another salt such as a nitrate.

SUMMARY OF INVENTION

Viewed from one aspect the invention provides a process for thermally spraying metal oxide coated ceramic particles onto a substrate comprising:

(I) obtaining a plurality of metal oxide coated particles of silicon carbide, silicon nitride, boron carbide or boron nitride; and
(ii) thermally spraying the particles of step (I) onto a substrate.

Viewed from another aspect the invention provides a process for thermally spraying metal oxide coated ceramic particles onto a substrate comprising:
(I) obtaining a plurality of metal salt coated particles of silicon carbide, silicon nitride, boron carbide or boron nitride, such as metal hydroxide and/or metal carbonate coated particles;
(II) calcining and sintering the particles of step (I) so as to form a plurality of metal oxide coated particles of silicon carbide, silicon nitride, boron carbide or boron nitride; and
(III) thermally spraying the particles of step (II) onto a substrate.

Viewed from another aspect the invention provides a process for thermally spraying metal oxide coated ceramic particles onto a substrate comprising:
(I) obtaining a plurality of metal hydroxide coated particles of silicon carbide, silicon nitride, boron carbide or boron nitride;
(II) calcining the particles of step (I) so as to form a plurality of metal oxide coated particles of silicon carbide, silicon nitride, boron carbide or boron nitride; and
(III) thermally spraying the particles of step (II) onto a substrate.

Viewed from another aspect the invention provides a process for thermally spraying metal oxide coated ceramic particles onto a substrate comprising:
(I) obtaining a plurality of particles of silicon carbide, silicon nitride, boron carbide or boron nitride;
(II) combining the particles of step (I) with at least one metal salt, such as two metal salts, in the presence of a weak acid or weak base so as to form a metal salt coating on said particles;
(III) drying, such as spray, drying the particles of step (II);
(IV) calcining and sintering the particles of step (III) so as to form a plurality of metal oxide coated particles of silicon carbide, silicon nitride, boron carbide or boron nitride; and
(V) thermally spraying the particles of step (IV) onto a substrate.

Viewed from another aspect the invention provides a process for thermally spraying metal oxide coated ceramic particles onto a substrate comprising:
(I) obtaining a plurality of particles of silicon carbide, silicon nitride, boron carbide or boron nitride;
(II) combining the particles of step (I) with at least one metal salt in the presence of a weak base so as to form a metal hydroxide coating on said particles;
(III) drying, such as spray drying, the particles of step (II);
(IV) calcining the particles of step (III) so as to form a plurality of metal oxide coated particles of silicon carbide, silicon nitride, boron carbide or boron nitride; and
(V) thermally spraying the particles of step (IV) onto a substrate.

Viewed from another aspect the invention provides a process for preparing metal oxide coated ceramic particles comprising:
(I) obtaining a plurality of particles of silicon carbide, silicon nitride, boron carbide or boron nitride;
(II) combining the particles of step (I) with at least one metal salt in the presence of a weak acid or a weak base so as to form a metal salt coating on said particles;
(III) drying such as spray drying the particles of step (II); and
(IV) calcining and sintering the particles of step (III) so as to form a plurality of metal oxide coated particles of silicon carbide, silicon nitride, boron carbide or boron nitride.

Viewed from another aspect the invention provides a process for preparing metal oxide coated ceramic particles comprising:
(I) obtaining a plurality of particles of silicon carbide, silicon nitride, boron carbide or boron nitride;
(II) combining the particles of step (I) with at least one metal salt in the presence of a weak base so as to form a metal hydroxide coating on said particles;
(III) drying such as spray drying the particles of step (II); and
(IV) calcining the particles of step (III) so as to form a plurality of metal oxide coated particles of silicon carbide, silicon nitride, boron carbide or boron nitride.

Viewed from another aspect the invention provides an article which has a coating thereon applied by a thermal spraying process as hereinbefore defined.

Viewed from another aspect the invention provides the use of metal oxide coated particles of silicon carbide, silicon nitride, boron carbide or boron nitride for thermally spraying onto a substrate.

Viewed from another aspect the invention provides metal oxide coated particles of silicon carbide, silicon nitride, boron carbide or boron nitride wherein the amount of metal oxide is at least 10 wt %, such as at least 20 wt %. The upper limit of metal oxide may be 40 wt % of the total weight of the particles, such as up to 35 wt %, especially up to 30 wt % such as those prepared by processes herein before defined.

Ideally, the invention provides a process for preparing metal oxide coated ceramic particles comprising:
(I) obtaining a plurality of particles of silicon carbide, silicon nitride, boron carbide or boron nitride;
(II) combining the particles of step (I) with at least two metal nitrates in the presence of a weak acid or a weak base;
(III) drying, such as spray drying, the particles of step (II); and
(IV) calcining and sintering the particles of step (III) so as to form a plurality of metal oxide coated particles of silicon carbide, silicon nitride, boron carbide or boron nitride.

DEFINITIONS

The term thermal spraying is used herein to cover either spraying using a combustion thermal spraying process, a detonation thermal spraying process (such as high frequency pulse detonation), or an electrical/plasma thermal spraying process. These techniques are not new and are familiar to workers in this field.

The term weak base or weak acid is used to require the presence of a chemical base or acid that does not ionize fully in an aqueous solution. A metal salt is an ionic compound of at least one metal ion and at least one anion. That anion may be organic or inorganic, preferably inorganic.

A metal hydroxide according to the invention is a compound containing a metal ion and $OH^-$ ion. It may contain other anions as well. Thus the compound boehmite AlOOH, is consider a hydroxide herein.

A metal carbonate according to the invention is a compound containing a metal ion and $CO_3^{2-}$ ion. It may contain other anions as well.

BRIEF DESCRIPTION OF THE DRAWINGS

FIG. 1 shows a particle of the invention with metal oxide coated silicon carbide with 30 wt % YAG composition.

FIG. 2 shows the XRD spectra of powders after precalcination process at 500° C. and sintering process at 1750° C. with respect to YAG phase content of 30 wt % in weight.

FIG. 5 shows sintered and agglomerated SiC powders suitable for HFPD (24-45 microns).

DETAILED DESCRIPTION OF INVENTION

Figure 3:
FIG. 3 shows the scanning electron micrograph of coating cross section of sprayed powders of the invention to show the nature of the coating. Note that the top layer in these electron micrographs is simply an epoxy layer added to allow images to be generated.

This invention relates to silicon carbide (SiC), boron carbide ($B_4C$), silicon nitride ($Si_3N_4$) and boron nitride (BN) particles coated with a metal oxide to enable their application onto a substrate via thermal spraying without sublimation or decomposition of the core ceramic. Whilst the invention will generally be described herein with reference to the term ceramic particles, this will be taken to mean SiC, silicon nitride, boron nitride or boron carbide. The use of Si in the ceramic and most especially the use of SiC is the most preferred option.

The metal oxide coating which we apply is thick enough to allow thermal spraying of the particles by protecting the core but of course, the oxide coating will also act as a sintering additive during the sintering process. The metal oxide coating will provide a matrix phase and acts as a wetting agent that melts during the spraying process. The melted oxide bonds SiC particles together and onto a substrate. It also provides high cohesive strength between particles.

The process of the invention begins with particles of ceramic such as SiC. The particle size is typically of the order of 50 nm to 5 microns such as 200 nm to 5 microns at this point, preferably 400 to 3500 nm. The particles are preferably not agglomerated at this time. The particles are preferably free flowing and therefore powder like or in the form of stable suspension. These particles are well known and can be bought on the open chemical market. These particles cannot however be directly thermally sprayed as they would decompose and sublime at the temperatures to which the particles would be exposed during the spraying process. Even sintered SiC cannot generally be thermally sprayed.

The inventors have realised that a solution to this problem exists by providing a sufficiently thick oxide coating on the particles. This coating must be capable of preventing the decomposition or sublimation of the ceramic particle during thermal spraying. The coating is not just present as a homogeneous sintering aid therefore, although it also performs this function thus avoiding the need for any further sintering aids to be present.

It is generally believed that in order to ensure that a sufficiently thick coating is present on the ceramic particles that there should be at least 5 wt % of the coating present, preferably at least 10 wt %, especially at least 20 wt %, especially at least especially at least 30 wt % on a coated particle. Values in the range of 5 to 40 wt %, such as 7.5 to 35 wt %, especially 10 to 30 wt % are envisaged. Of course the thickness of the coating needed might depend on the thermal spraying conditions used.

In order to introduce an oxide coating onto the ceramic particles the present inventors have realised that this can be achieved via calcination and sintering of a precursor coating. Ideally, the precursor coating is formed via precipitation of at least one metal salt onto the ceramic particle substrate, via precipitation of at least one metal salt sol onto the ceramic particles or via spray drying of a mixture of at least one metal salt and ceramic particles. Ideally, there will always be two or more metal salts present however it is possible for one salt to be used. In the case of boron nitride for example, useful particles can be made with $Y_2O_3$ or MgO as the oxide coating so only one precursor metal salt could be used. In the case of boron carbide, we can use only $Al_2O_3$ so again, only one metal salt need be used.

Thus, in order to introduce an oxide coating onto the ceramic particles the present inventors have realised that this can be effected during calcination of a non oxide coating. The metal salt used therefore is preferably not an oxide. In particular, the inventors sought to include a hydroxide or carbonate (or ideally a mixture of hydroxide/carbonate) precursor coating on the particles. When the precursor coating is calcined in the presence of oxygen, this converts to an oxide coating.

The inventors have also realised that there are various ways of providing a metal hydroxide and/or carbonate coating or other salt based coating onto the ceramic particles. This can be achieved via co-precipitation of metal salt precursor onto the particles or via precipitation of metal salt sol onto the ceramic particles or via spray drying of an appropriate mixture.

Thus, it is preferred if the ceramic particles are contacted with 5 to 50 wt %, preferably 7.5 to 40 wt %, such as 10 to 35 wt %, especially 11 to 30 wt % of a metal salt(s) or metal salt sol. In some embodiments there should be more than 10 wt % of the metal salt(s) or metal salt sol present. Thus if there is 1 g of ceramic particles (solids in any carrier medium) 40 wt % of metal salts represents 400 mg.

The metal in the salt or salts used in the invention can be any from the alkaline earth series, transition metals series or Al. Preferably, the metal is Al, Mg, or a first or second row transition metal such as Y, Zr or Ti. The use of Al and Y is especially preferred.

The counterion is preferably not an oxide but is a counterion that can preferably be converted to hydroxide or carbonate (if necessary) and then to an oxide during the process of the invention. Preferred counter ions are therefore nitrates, halides, sulphates, sulphides and nitrites. A hydroxide or carbonate can also be used directly. The use of nitrates is especially preferred.

In order to ensure a successful coating operation, the salt is preferably one that deposits on the ceramic particles as a hydroxide or carbonate during the coating process or at least converts to such a hydroxide or carbonate during the coating process. The presence of a hydroxide or carbonate precursor coating is the key to the subsequent formation of a oxide coating.

In a further more preferred embodiment, it is preferred if a mixture of metal salts is used as an oxide coating precursor. In particular, the use of two different salts is preferred. Where two salts are used, it is preferred if the metal ions are different. It is also preferred if the two counterions are the same. Thus, the use of two different metal nitrates is especially preferred.

Metal salt(s) of interest are preferably soluble in the solvent used during the process, especially water soluble.

Highly preferred metal salts of use in the invention are $Al(NO_3)_3$, (gives $Al_2O_3$), $Y((NO_3)_3$ (gives $Y_2O_3$), $Mg(NO_3)_2$ (gives MgO on calcination). In particular, salts may be hydrates. Preferred salts are $Al(NO_3)_3 \cdot nH_2O$; $Y(NO_3)_3 \cdot nH_2O$; $AlCl_3 \cdot nH_2O$; $YCl_3 \cdot nH_2O$; $Y_2(CO_3)_3 \cdot nH_2O$.

Ideally, when two metal salts are present, the combination of the metal salts form a eutectic of metal oxides after calcination. Thus, the amount of metal salts added to the ceramic is carefully measured such that a eutectic system is formed. A eutectic system is a mixture of chemical compounds or elements that has a single chemical composition that solidifies at a lower temperature than any other composition made up of the same ingredients. In this field, the person skilled in the art is aware of certain combinations of metal salts that form eutectics. For example, the use of certain proportions of aluminium nitrate and yttrium nitrate forms a eutectic of yttrium aluminium garnet after calcination (YAG, $Y_3Al_5O_{12}$).

In a first embodiment, metal oxide precursors are introduced onto the ceramic particles via co-precipitation. Metal salt(s) precursor co-precipitation may be performed by mixing the ceramic particles with the precipitator compound(s) in an aqueous suspension, such as one containing 3 to 10 wt % of solid contents, preferably about 5 wt %. The suspension can be stirred to breakdown any agglomerates and to homogenize and disperse the ceramic particles.

The mixed suspension may then be heated to 50° to 100° C., preferably about 90° C. to assist the precipitation process. The eutectic metal salt(s) solution can be delivered into the mixed suspension in any order. However, a reverse titration method where the eutectic salts are added in a controlled order is preferred. The use of a precipitator compound is preferred to ensure activation of a hydroxide or carbonate precipitation that ideally forms a coating onto silicon carbide particles during the process.

Alternatively, the metal salts, precipitator and particles can be combined and spray dried in order to introduce a coating onto the particles, in particular where a weak acid is used as the precipitator. Spray drying may provide more spherical particles and hence allow better flowability.

Thus, the key to a successful coating operation is the presence of a "precipitator" compound which enables precipitation of the metal salts onto the ceramic particles. This compound is a weak acid or a weak base. The precipitator compound can be present in a molar amount of around 1 to 30 times, preferably 3 to 30 times such as 5 to 30 times the molar amount of metal salt(s) present, preferably 6 to 20 times, especially 5 to 10 times, such as 8 to 10 times.

Where a weak acid is used, the molar ratio of precipitator to total metal cation is preferably 1 to 3. Where a weak base is used, an ideal molar ratio of precipitator to total metal cation is 6 to 8.

In some embodiments, it is preferred that the amount of precipitator compound present is such that the pH of the mixture is basic, e.g. pH 9-11. Ideally, during the coating process, the pH of the suspension is 9 or more when a weak base is employed as the precipitator. When a weak acid is used, pH values as high as 1 to 2 can be employed.

Precipitator compounds of interest are weak acids such as alkanoic acids (ethanoic acid, methanoic acid), HF, formic acid and organic acids such as citric acid. The use of citric acid is especially preferred. Alternatively, preferred compounds are weak bases such as ammonium hydroxide, alkylamines, but in particular urea, ammonia solution and hydrogen carbonates such as ammonium hydrogen carbonate. Ideally, the precipitator compound is water soluble. The use of urea or ammonium hydrogen carbonate is especially preferred.

When particles are spray dried, it is preferred that the precipitator compound is a weak acid such as citric acid as this gives the best final agglomerated SiC powders compared to when a weak base is used.

In another embodiment, the metal oxide coating is produced via precipitation of a metal salt sol such as a hydroxide sol. The ceramic particles are mixed with the metal salt sol to form a mixed suspension, such as one containing total solid loading of 3 to 20 wt %, such as 3 to 10 wt % of the ceramic particles, such as about 5 wt % or 10 wt % of ceramic particles. The solvent is preferably water. Stirring can again be used to homogenize the suspension. The precipitator compound is then added in controlled order, preferably using titration to assist precipitation of metal salt sol layer onto the ceramic particles. The heating of the mixed suspension and control of the pH are part of the process that defines the successful metal salt sol precipitation. It is preferred to heat the suspension in between 50° to 100° C., preferably about 90° C. to assist the process. The pH can be maintained at levels of lower than 2 if a weak acid is used or 9 or more, such as 9 to 11 if a weak base is used.

Preferred metal sol precursors are inorganic metal salts or metal organic compounds such as metal alkoxides, boehmite [AlO(OH)] or basic yttrium carbonate [$Y(OH)CO_3$].

The amount of deposition is a function of the amount of metal salts or metal salt sol added according molar ratio to weight percentage calculation. More salt(s) in the system gives a thicker coating.

This process can take place at ambient temperature. However, the temperature of precipitator activation is preferably from 50° C. to 100° C. For ammonium hydrogen carbonate a temperature of about 50° C. is preferred. For urea and citric acid, a preferred temperature is about 90° C. Also, the pressure can be ambient.

It may, however, be necessary to use a dispersant in the mixed suspension to disperse the ceramic particles and avoid agglomeration in the presence of the precipitator and during the addition of the metal salt(s). Conventional dispersants can be used such as those sold under trade names Dolapix A-88 or Dolapix CE-64. The dispersant is therefore a non reactive surfactant type material.

Without wishing to be limited by theory, the inventors envisage that the precipitator compound causes the starting metal salts such as a nitrate to undergo reaction to for example, corresponding hydroxide and carbonate salts. It may be these salts that deposit on the surface of the ceramic particles and which are converted to the oxide during calcination.

This process therefore allows the formation of a coating such as a hydroxide or carbonate coating on the ceramic particles. As the metal salt(s) are preferably water soluble, it is believed that there will be no free metal salt particles formed in the suspension. Moreover, it is also preferred if the precipitator compound is water soluble. There should therefore be no particles formed from metal salt or precipitator compound.

In one embodiment, a metal sol such as boehmite [AlO(OH)] is used in the precipitation methods or is generated during the precipitation process. Particles such as silicon carbide particles are mixed with metal sol precursor accordingly. The precipitate compound then added with titration, ideally until the suspension pH is between 9 to 11.

In a most preferred embodiment, a mixture of $Al(NO_3)_3+Y(NO_3)_3$ is used in the method of the invention. The molar ratio of these metal salts may be 5:3 as this forms a eutectic and yields yttrium aluminium Garnet (YAG) upon calcination and sintering.

Once coating has occurred the particles can be filtered from the rest of the suspension and the particles are dried, preferably spray dried using conventional lyophilisation processes. The coated particles which form at this stage of the proceedings tend to agglomerate and can have particle sizes of 10 microns or more, such as 15 microns or more, such as 20 to 50 microns.

Where an hydrogen carbonate precipitator is used, it is preferred if the particles are spray dried although conventional oven type drying is also possible. Where however a urea precipitator is used, the coated particles are preferably oven dried before further treatment (such as calcination, sintering, sieving etc).

The co-precipitation process using AHC can be spray-dried directly after the titration process without filtering. However, when a urea precipitator is used, it is preferred if filtration occurs and the filtrate combined with fresh distilled water (and optional PVA and PEG addition). The solid content can be increased up to 20 to 40 wt % to reduce drying cost.

The coated particles are then calcined. Calcination can occur at conventional temperatures and using conventional techniques. A temperature of 400 to 800° C. is preferred such as 500-600° C. A temperature of 800 to 1200° C. is also possible such as 900 to 1000° C. but is less preferred. The process takes place in the presence of air to ensure oxidation of the hydroxide to an oxide coating.

After calcination, the particles can be sintered. The sintering of oxide coated SiC particles preferably takes place under argon atmospheric furnace with temperature up to 2000° C. such as up to 1750° C. Ideally sintering takes place at a temperature of 1000° C. to 2000° C., such as 1300 to 1800° C.

Particles sizes are again around 20 to 100 microns at the end of the calcination and sintering process.

Because the amount of metal salt(s) added to form the coating is relative high, this means that the thickness of the coating and hence also the oxide coating is thicker than a coating that might occur if, for example, a coating is introduced simply as a sintering aid. The presence of a thick coating means that the oxide coating is capable of preventing degradation of the ceramic particle during thermal spraying. Rather than decomposing or subliming, the ceramic particle can be successfully thermally sprayed.

It is envisaged therefore that metal oxide coated ceramic particles of the invention will comprise at least 5 wt %, such as at least 10 wt %, preferably at least 20 wt % of the oxide coating. The oxide coating ideally forms 11 to 40 wt % of the coated ceramic particles as a whole or 10 to 30 wt %. The coating wt. % on the SiC particles can be quantitatively calculated based on the XRD pattern using Rietveld method.

The thickness of the particulate oxide coating on the ceramic particles may preferably be in the range of 50 to 200 nm. It is generally observed of course that thicker coatings are present on larger particles.

The inventors envisage that the coating will form a complete coating around the ceramic particle. Any break in the coating could offer potential for decomposition. Our coating can therefore be considered continuous. That said, even if there is a possibility that the oxide coating may break down, perhaps during the manufacturing process or thermal spraying process, the desired result can still be achieved. During the thermal spraying process, the oxide coating melts. The oxide coating can therefore cover up any breaks in the coating whilst bonding together layers of the spray coating material.

It will be appreciated that before spray drying or before calcination and sintering some binders (additives) might be added as is known in the art to ensure successful drying processes. Polyvinyl alcohol (PVA) might be added to assist agglomeration to create round shaped powder. PEG might be added to increase the flowability of suspension preventing the clogging of the spray-drying nozzle and allowing easy transfer of the spray-dried powder and so on.

The process of the invention leads to the formation of agglomerated and sintered ceramic powders containing, inter alia, yttrium aluminium garnet coated on each ceramic particle.

After sieving (and before thermal spraying), the powder with size 20-45 micron can preferably be used as feedstock for high frequency pulse detonation or high velocity oxy fuel thermal spray techniques. Bigger powders that have size of 45-90 micron may be used for atmospheric plasma spraying.

Thermal Spraying

The particles formed after calcination can then be thermally sprayed onto a substrate. Various thermal spray techniques could be used such as those based on combustion (e.g. flame spraying or HVOF), detonation (detonation gun or high frequency detonation gun) or electrical/plasma spraying (atmospheric plasma spraying, wire arc spraying, low pressure plasma spray or vacuum plasma spray). Preferred spraying techniques involve a high frequency detonation gun, an HVOF technique or atmospheric plasma spray. As noted above, these techniques are well known and a complete summary of them is not required here.

The use of a detonation gun is preferred and is explained in detail in U.S. Pat. No. 6,745,951. A detonation gun for thermal spraying is formed by a combustion chamber and a barrel, with entrances for fuel and for oxidizer. It is also provided with one or more spark plugs for detonating the fuel-oxidizer mixture and one or more injectors for the introduction of the product into the barrel.

High velocity oxy-fuel spraying involves a mixture of gaseous or liquid fuel and oxygen which is fed into a combustion chamber, where they are ignited and combusted continuously. The resultant hot gas at a pressure close to 1 MPa emanates through a converging-diverging nozzle and travels through a straight section. The jet velocity at the exit of the barrel (>1000 m/s) exceeds the speed of sound. The feed stock is injected into the gas stream, which accelerates the powder up to 800 m/s. The stream of hot gas and powder is directed towards the surface to be coated. The powder partially melts in the stream, and deposits upon the substrate.

In plasma spraying processes, the material to be deposited is introduced into the plasma jet, emanating from a plasma torch. In the jet, where the temperature is on the order of 10,000 K, the material is melted and propelled towards a substrate. There, the molten droplets flatten, rapidly solidify and form a deposit.

The substrate onto which the coated particles are thermally sprayed is not limited and can therefore be any substrate of interest to the skilled person. The present inventors have particular interest in spraying the particles onto the mechanical working parts of large industrial equipment such as wind turbines.

The substrate is therefore preferably a metallic substrate such as steel and its alloy, aluminium and its alloy and other metal or a polymer substrate.

The coating thickness on the substrate can vary depending on thermal spray parameters. Thicknesses from 10 micron to 500 micron, preferably 100 to 200 microns are possible.

The coatings formed on the substrate have excellent wear and corrosion resistance properties. In general the coatings are rough (Ra=4.2 micron) as sprayed. To improve performance for wear applications, it may be necessary to polish the as sprayed surface until the surface is very smooth (Ra=0.1 micron)

In order to maximise the efficiency of the thermal spraying process, it might be necessary to prepare the substrate surface for coating. The substrate surface should be clean. It might also be blasted with grit or the like to create a rough surface that helps adhesion of the coating during thermal spraying.

The invention will now be further described with reference to the following non limiting examples and figures.

EXAMPLE 1

Oxide Coated Silicon Carbide from Metal Salt

This example is based on the following presumed reactions with Ammonium Hydrogen Carbonate (AHC):

1. Initial Hydrolysis of AHC in Distilled Water:

$$NH_4HCO_3 + H_2O \rightarrow NH_4OH + H_2CO_3$$

$$NH_4OH \leftrightarrow NH_4^+ + OH^-$$

$$H_2CO_3 \rightarrow H^+ + HCO_3^-$$

$$HCO_3^- \rightarrow H^+ + CO_3^{2-}$$

2. Aluminum Nitrate Reaction:

$$Al(NO_3)_3 \cdot 9H_2O + 3NH_4HCO_3 = AlOOH + 3(NH_4)NO_3 + 3CO_2 + 10H_2O \text{ (boehmite or aluminium hydroxide)}$$

If the suspension is aged for several hours under ambient temperature, the hydroxide might react and form ammonium dawsonite $$Al(NO_3)_3 \cdot 9H_2O + 4NH_4HCO_3 = NH_4Al(OH)_2CO_3 + 3(NH_4)NO_3 + 3CO_2 + 10H_2O \text{ (ammonium dawsonite)}$$

$$AlOOH + NH_4HCO_3 = NH_4Al(OH)_2CO_3$$

3. Yttrium Nitrate Reaction:

$$2Y(NO_3)_3 \cdot 6H_2O + 6NH_4HCO_3 = Y_2(CO_3)_3 \cdot 6H_2O + 6NH_4NO_3 + 3CO_2 + 9H_2O \text{ (normal carbonate hydrate)}$$

or $$Y(NO_3)_3 \cdot 6H_2O + 3NH_4HCO_3 = Y(OH)CO_3 + 3(NH_4)NO_3 + 2CO_2 + 7H_2O \text{ (basic carbonate)}$$

The following flow diagram explains the process:

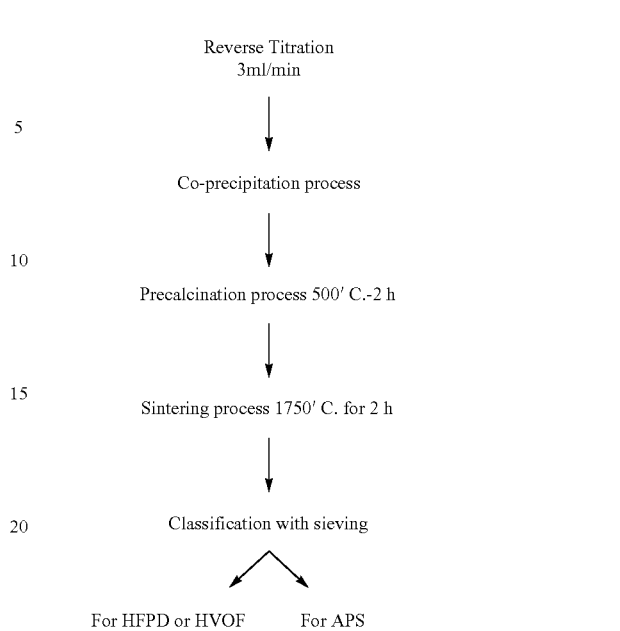

A metal oxide coated silicon carbide agglomerated powder for thermal spray feedstock containing 30 wt % in weight of YAG was prepared by a co-precipitation method of a metal salt precursor onto a silicon carbide particle. The silicon carbide particles used had a mean granulometry of 0.6 micron. The coated metal oxide was confirmed by the micrograph in FIG. 1 and FIG. 2 which show the YAG phase coated silicon carbide and an X-ray crystallogram of the coated silicon carbide powder respectively.

The YAG phases that coated onto the silicon carbide surface are an eutectic phase of $Al_2O_3$ and $Y_2O_3$ that result from calcination of a coated metal hydroxide co-precipitation from mixed solution of $Al(NO_3)_3 \cdot 9H_2O$ and $Y(NO_3)_3 \cdot 6H_2O$ according to molar ratio Y:Al=5:3. The designed stoichiometry composition leads to 30% in weight of YAG phases.

The co-precipitation of YAG phase was started by dispersing 100 gram of silicon carbide particles in distilled water. About 0.4 wt % of dispersant is added to stabilise the silicon carbide suspension. The dispersant was Dolapix A-88 dispersant from Zschimmer & Schwarz GmbH & Co KG. Magnetic stirring was utilized to homogenize the suspension. 721.96 ml of 6.4 M of ammonium hydrogen carbonate precipitator agent was added into SiC suspension. The suspension was heated to 50° C. before the mixed metal salt (formed from 721.96 ml of 0.5 M $Al(NO_3)_3 \cdot 9H2O$ and 721.96 ml of 0.3 M $Y(NO_3)_3 \cdot 6H_2O$) was titrated into the suspension mixture. The suspension now containing metal hydroxide/carbonate coated silicon carbide particles was then filtered and washed with distilled water.

The treated powder was dried in the oven and pre-calcinated at 500 C for 2 hour in air furnace. Sintering was employed to the agglomerated powders in vacuum or argon environment at 1750° C. for 2 h.

In a second experiment, the treated SiC powders were spray dried by introducing distilled water to yield solid content of 20-40 wt. %. Polyvinyl alcohol and polyethylene glycol are added to assist the spray drying process. The spray dried powders are then pre-calcinated at 500° C. for 2 hours in air furnace before performing sintering at 1750° C. for 2 h in vacuum or argon environment.

In both procedures, the agglomerated and sintered powders need to be sieved to assure exact powder size distribution based on the type of thermal spraying methods. After the spray drying we can get desired particles size. However, during the sintering, shrinkage and agglomeration occur causing the particles size to deviate. Thus sieving is employed to make classification the agglomerated powders. FIG. 5 shows the feedstock for HFPD.

EXAMPLE 2

Substrate Coating

The powder of example 1 (oven dried) with powders size of 20-45 μm was sprayed onto a carbon steel substrate with a high frequency pulse detonation gun according to the following parameters:
Gas flow: 48 SLPM propylene plus 170 SLPM oxygen (SLPM=standard litres per minute)
Frequency: 60 Hertz
Distance of the torch from the substrate: 40 mm
Powders feeding with Thermico CPF-2 employ nitrogen carrier gas 20
SLPM and feeder disk 10 rpm rotation.
Number of torch scan on substrate: 4×6 second.

At the end of the deposition, the coating samples were characterized with x-ray crystallography. FIG. 2 shows the crytallogram of the powder deposition containing SiC+30 wt. % YAG. The X-ray crystallogram of the powder before deposition and the coating are practically identical. This means that no decomposition has occurred in the thermal spraying process. In FIG. 2 the peak positions of the two compounds are marked.

A scanning electron micrograph of the coating cross section is performed resulting in the structure as shown in FIG. 3. The typical structure where YAG phases (show as brighter area) are surrounding silicon carbide (show as darker area) as expected from the coating deposition produced with these powder feedstocks.

Figure 4:
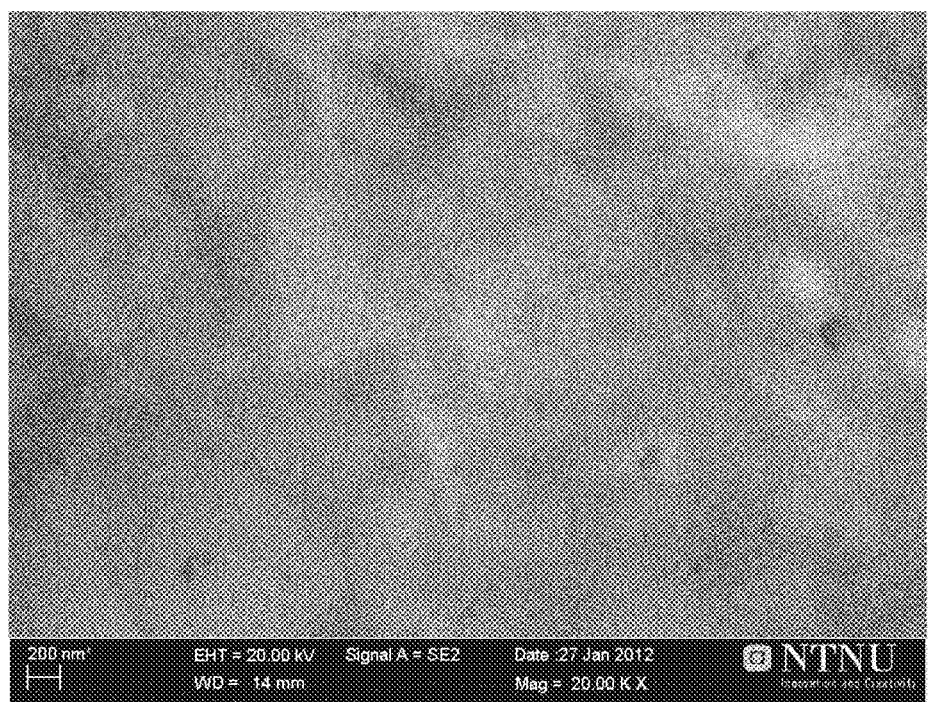
FIG. 4 is an enlarged view of sprayed powders of the invention to show the nature of the coating.

The agglomerated particles are around 45 micron in size. When they travel in the flame during thermal spraying, they deform as the oxide melts and flatten on contacting the substrate. As more particles contact the substrate a coating layer (with each layer perhaps only 5-10 micron in thickness) begins to form. Thus a 100+ micron coating on a substrate is easily achievable as shown in FIG. 3. Carefully study of the magnification of the coating shows that it composes of small SiC particles bonded by oxide phase (FIG. 4).

EXAMPLE 3

The process of example 1 was repeated but this time using 3 micron silicon carbide particles.

EXAMPLE 4

Oxide Coated Silicon Carbide from Metal Salt Precursor with Urea Precipitator The encapsulated oxide will protect SiC particles from direct interaction with the plasma thus inhibiting decomposition.
Ingredients:
a. α-SiC particles with $d_{50}$=0.6 μm supplied by Washington Mills AS, Orkanger, Norway
b. $Al(NO_3)_3 \cdot 9H_2O$ (Merck KGaA, Germany)
c. $Y_2O_3$ H.C. Starck Grade C (dissolved into HNO3 solution to produce $2Y(NO_3)_3 \cdot 3H_2O$ following reaction of $Y_2O_3 + 6HNO_3 + 9H_2O \rightarrow 2Y(NO_3)_3 \cdot 6H_2O$.
d. Precipitator Weak base: Urea
e. Dispersant: Dolapix A88 (Zschimmer & Schwarz GmbH & Co KG., Germany)

The following flow diagram explains the process:

Reverse Titration
3ml/min
↓
Co-precipitation process
↓
Precalcination process 500' C.-2 h
↓
Sintering process 1750' C. for 2 h
↓
Classification with sieving
↙   ↘
For HFPD or HVOF    For APS Procedures:
Total solid loading after co-precipitation process is approximately 5 wt. %

Molar ratio of $Urea/(Al^{3+}+Y^{3+})=7.5$ 100 g of α-SiC particles was dispersed in 721.96 ml of 6 M Urea and stirred at 600 rpm for 30 minutes. 0.4 wt. % Dolapix A88 was added to stabilize the SiC suspension containing urea stirred for 15 minutes. The mixture was heated to 90° C. Separately, a metal salt solution of YAG salt precursor (ratio of $Al^{3+}:Y^{3+}=5:3$) was prepared by combining 721.96 ml of 0.5 M $Al(NO_3)_3 \cdot 9H_2O$ and 721.96 ml 0.3 M $Y(NO_3)_3 \cdot 6H_2O$. This will gives yttrium aluminum garnet ($Y_3Al_5O_{12}$) content of 30 wt. % upon sintering. The metal salt precursor solution was reverse titrated into the SiC suspension with flow rate 3 ml/min. The pH of the suspension was kept at 9 or higher with addition of $NH_4OH$.

After the titration process is finished, the suspension was aged for 1 hour (aging=stirring at 600 rpm with temperature kept at 90° C. for an hour). The aged suspension was filtered to remove excess $NO_3^{2-}$ ion. The supernatant of SiC was then dried in the furnace at 100° C. for 24 hours.

The dried SiC was pre-calcined at 500° C. for 2 hours to remove the hydroxide and carbonate species which form the coating at this stage of the process. Further sintering at 1750° C. was performed in an argon atmospheric furnace to crystallize and sinter the agglomerated SiC powders.

The agglomerated and sintered powders are classified with sieving machine to produce 25-45 μm and 45-90 μm powders. The agglomerated powders of 25-45 μm are mainly used for high frequency pulse detonation (HFPD) gun, while modified SiC powders of 45-90 μm are used mainly for atmospheric plasma spray (APS) system.

The following theoretical reactions may take place:

Reactions with Urea:
1. Initial Hydrolysis of Urea in Distilled Water $$CO(NH_2)_2 \rightarrow NH_4^+ + OCN^- \text{ (initial hydrolysis)}$$

$$OCN^- + 2H^+ + H_2O \rightarrow CO_2 + NH_4^+ \text{ (in acidic medium)}$$

$$OCN^- + OH^- + H_2O \rightarrow NH_3 + CO_3^{2-} \text{(in neutral or basic solution)}$$

2. Aluminum Nitrate Reaction $$2Al(NO_3)_3 \cdot 9H_2O + 3CO(NH_2)_2 \rightarrow 2AlOOH + 6(NH_4)NO_3 + 3CO_2 + 11H_2O \text{ (boehmite or aluminium hydroxide)}$$

Or $$Al(NO_3)_3 \cdot 9H_2O + 2CO(NH_2)_2 \rightarrow NH_4Al(OH)_2CO_3 + 3(NH_4)NO_3 + CO_2 + 4H_2O \text{ (ammonium dawsonite)}$$

3. Yttrium Nitrate Reaction $$2Y(NO_3)_3 \cdot 6H_2O + 3CO(NH_2)_2 \rightarrow Y_2(CO_3)_3 \cdot 6H_2O + 6(NH_4)NO_3 + CO_2 + 5H_2O \text{ (normal carbonate)}$$

$$Y^{3+} + H_2O = (Y(OH))^{2+} + H^+ (Y(OH))^{2+} + CO_2 + 2H_2O = Y(OH)CO_3 \cdot H_2O + 2H^+ \text{ (basic carbonate)}$$

The powders formed by oven or spray drying in examples 1, 3 and 4 can be thermally sprayed by HFPD, HVOF or APS.

EXAMPLE 5

Thermal Spray Process

Atmospheric Plasma Spray Process

The powder of example 1 (oven dried) with powders size of 45-90 μm was sprayed onto carbon steel substrate with atmospheric plasma spray gun F4-MB plasma gun with 6 mm anode diameter installed in a plasma spray system A3000S (Sulzer Metco, Wolhen, Switzerland) according to the following parameters:
  Gas flow: 45 SLPM Argon plus 12 SLPM Hydrogen (SLPM=standard litres per minute)
  Current: 700 Ampere
  Voltage: 47 Volt
  Injector diameter=1.8 mm
  Distance of the plasma torch from the substrate: 100 mm
  Digital powder feeding rotation: 20 rpm with Ar carrier gas at 2.8 SLPM
  Robot movement 0.2 m/sec
  Number of torch scan on substrate: 4×6 second.

At the end of the deposition, the coating samples were characterized with x-ray crystallography. FIG. 2 shows the crytallogram of the powder feedstock containing 30 wt. % YAG and the SiC composite coating produced using HFPD and APS. The X-ray crystallogram of the SiC phase before deposition and in the coating are practically identical. This means that no decomposition of SiC has occurred in the thermal spraying process.

When the agglomerated powders travel in the flame during thermal spraying, they deform as the oxide melts and flatten on contacting the substrate. As more particles contact the substrate a coating layer (with each layer perhaps only 5-10 micron in thickness) begins to form. Thus a 100+ micron coating on a substrate is easily achievable.

Carefully study of the magnification of the coating shows that it composes of small SiC particles bonded by oxide phase.

EXAMPLE 6

Oxide Coated Silicon Carbide from Spray Dried Process

The spray-dried metal salt precursor mixed with SiC particles will produce hydroxide or carbonate metal precursor encapsulated SiC particles. As this process creates agglomerated SiC powders with nano precipitate of metal precursor, the sintering process create YAG coated SiC powders feedstock Ingredients:
  a. α-SiC particles with $d_{50}=1$ μm supplied by Saint Gobain Ceramic Materials AS Lillesand, Norway
  b. $Al(NO_3)_3 \cdot 9H_2O$ (Merck KGaA, Germany)
  c. $Y_2O_3$ from H.C. Starck Grade C (dissolved into HNO3 solution to produce $Y(NO_3)_3 \cdot 6H_2O$ following reaction of $Y_2O_3 + 6HNO_3 + 9H_2O \rightarrow 2Y(NO_3)_3 \cdot 6H_2O$.
  d. Precipitator Weak acid: Citric acid
  e. Dispersant: Dolapix A88 (Zschimmer & Schwarz GmbH & Co KG., Germany)

The flow diagram below explains the process:

Mix at 80' C. and stir for 1 hr

↓

Spray dry process

↓

Precalcination process 500' C.-2 h

↓

Sintering process 1750' C. for 2 h

↓

Classification with sieving

↙ ↘

For HFPD or HVOF    For APS

Procedures:
Total solid loading after co-precipitation process is approximately 10 wt. %

Molar ratio of Citric Acid/($Al^{3+}+Y^{3+}$)=3

100 g of α-SiC particles were dispersed in 360.98 ml of 4.8 M citric acid and stirred at 600 rpm for 30 minutes. 0.4 wt. % Dolapix A88 was added to stabilize the SiC suspension containing citric acid and stirred for 15 minutes. The suspension was heated to 80° C.

Separately, a metal salt solution of YAG salt precursor (ratio of $Al^{3+}:Y^{3+}=5:3$) was prepared by mixing 360.98 ml of 1 M $Al(NO_3)_3 \cdot 9H_2O$ and 360.98 ml 0.6 M $Y(NO_3)_3 \cdot 6H_2O$. This will gives yttrium aluminum garnet ($Y_3Al_5O_{12}$) content of 30 wt. % upon sintering. The metal salt solution was poured stepwise into SiC suspension and stirred for 1 hour.

A spray drier was heated until the inlet temperature reached 210° C. and the outlet temperature was stable at between 90 to 110° C. The SiC/metal salt solution mixture was spray dried, with adjustment of the suspension feed and the aspirator to produce spherical agglomerated SiC with desired particles size in between 25-90 micron.

These particles were calcined at 500° C. for 2 hours in the atmospheric furnace to remove the hydroxide and carbonate species that form during spray drying. Further sintering at 1750° C. is performed in an argon atmospheric furnace to crystallize and sinter the agglomerated SiC powders. The agglomerated and sintered powders are classified with sieving machine to produce 25-45 μm and 45-90 μm powders. The agglomerated powders of 25-45 μm are mainly used for high frequency pulse detonation (HFPD) gun, while modified SiC powders of 45-90 μm are used mainly for atmospheric plasma spray (APS) system.

The invention claimed is:

1. A process for thermally spraying metal oxide coated ceramic particles onto a substrate comprising:
   (I) obtaining a plurality of particles selected from the group consisting only of silicon carbide, silicon nitride, boron carbide or boron nitride, wherein said particles having a continuous coating consisting only of yttrium aluminum garnet; and
   (ii) thermally spraying the particles of step (I) onto a substrate, wherein the yttrium aluminum garnet coating forms at least 20 wt % of the coated particle weight before the thermal spraying process.

2. A process as claimed in claim 1 in which the particles are silicon carbide particles.

3. A process as claimed in claim 1 wherein the thermal spraying is effected using a detonation gun.

4. A process as claimed in claim 1 in which the substrate is metallic.

5. A process as claimed in claim 1 in which the yttrium aluminum garnet coating forms from 20 wt % to 40 wt % of the coated particle weight before the thermal spraying process.

6. A process for thermally spraying metal oxide coated ceramic particles onto a substrate comprising:
   (I) obtaining a plurality of particles selected from the group consisting only of silicon carbide, silicon nitride, boron carbide or boron nitride wherein said particles have a coating consisting only of an aluminum salt and an yttrium salt;
   (II) calcining and sintering the particles of step (I) so as to form a plurality particles of silicon carbide, silicon nitride, boron carbide or boron nitride, wherein said particles having a continuous coating consisting only of yttrium aluminum garnet; and
   (III) thermally spraying the particles of step (II) onto a substrate, wherein the yttrium aluminum garnet coating forms at least 20 wt % of the coated particle weight before the thermal spraying process.

7. A process as claimed in claim 6 in which the particles are coated with a hydroxide and/or carbonate prior to calcination.

8. A process for thermally spraying metal oxide coated ceramic particles onto a substrate comprising:
   (I) obtaining a plurality of particles selected from the group consisting only of silicon carbide, silicon nitride, boron carbide or boron nitride;
   (II) combining the particles of step (I) with a salt consisting only of an aluminum salt and an yttrium salt in the presence of a weak acid or weak base so as to form a metal salt coating on said particles;
   (III) drying the particles of step (II);
   (IV) calcining and sintering the particles of step (III) so as to form a plurality of particles of silicon carbide, silicon nitride, boron carbide or boron nitride, wherein said particles having a continuous coating consisting only of yttrium aluminum garnet; and
   (V) thermally spraying the particles of step (IV) onto a substrate, wherein the yttrium aluminum garnet coating forms at least 20 wt % of the coated particle weight before the thermal spraying process.

9. A process as claimed in claim 8 wherein the metal salts are combined with the particles in water.

10. A process as claimed in claim 8 wherein the metal salts generate a boehmite coating on the particles.

11. A process as claimed in claim 8 wherein there is 1 to 30 times the molar ratio of weak base or weak acid to metal cation of the metal salts.

12. A process as claimed in claim 8 wherein the pH during step (II) is at least 9 when a weak base is used or 2 or less when a weak acid is used.

13. A process as claimed in claim 8 wherein the metal salts are titrated into a solution of the weak base or weak acid with particles or wherein the weak base or acid is titrated into a solution of the metal salt and the particles.

14. A process as claimed in claim 8 wherein the metal salts, weak base or weak acid and the particles are combined and spray dried in order to coat the particles with the metal salt coating.

15. A process as claimed in claim 8 wherein the weak base is urea, ammonia or a hydrogen carbonate.

16. A process as claimed in claim 8 wherein the metal salts of step (II) are a mixture of yttrium nitrate and aluminium nitrate.

17. A process as claimed in claim 8 wherein the metal salts, weak base or weak acid and the particles are combined and spray dried in order to coat the particles with the metal salt coating to produce a metal coating, wherein the metal coating comprises a metal hydroxide and/or metal carbonate coating.

18. A process as claimed in claim 8 wherein the weak base is ammonium hydrogen carbonate and the weak acid is citric acid.

19. A process as claimed in claim 8 wherein when a weak acid is used the molar ratio of weak acid to the metal cation present in the metal salts is 1 to 3 and when a weak base is used the molar ratio of weak base to the metal cation present in the metal salts is 6 to 8.

20. A process as claimed in claim 8 wherein step (III) comprises spray drying the particles of step (II).

* * * * *